United States Patent [19]

Pickton

[11] Patent Number: 5,200,468
[45] Date of Patent: Apr. 6, 1993

[54] BLENDS OF NYLON M5T AND AN IONOMER

[75] Inventor: Joseph Pickton, New Providence, N.J.

[73] Assignee: Hoechst Celanese Corp., Somerville, N.J.

[21] Appl. No.: 601,842

[22] Filed: Oct. 23, 1990

[51] Int. Cl.⁵ .................................................. C08L 77/00
[52] U.S. Cl. ................................... 525/183; 525/178; 525/919
[58] Field of Search ................. 525/66, 182, 183, 184, 525/919, 178

[56] References Cited

U.S. PATENT DOCUMENTS

| | | |
|---|---|---|
| 3,526,680 | 9/1970 | Cherdron . |
| 4,612,155 | 9/1986 | Wong et al. ........................ 525/184 |
| 4,731,396 | 3/1988 | Auerback et al. . |
| 4,990,562 | 2/1991 | Chou et al. ........................... 525/58 |

FOREIGN PATENT DOCUMENTS 69-19551 8/1969 Japan .

*Primary Examiner*—John Kight, III
*Assistant Examiner*—Shelley Wright
*Attorney, Agent, or Firm*—Joseph M. Mazzarese

[57] ABSTRACT

Polymer compositions are provided which are capable of being formed into shaped articles and comprise a poly(2-methylpentamethylene terephthalamide), also known as nylon M5T, and a minor amount of an ionomer, e.g., a partially neutralized copolymer of an alpha-olefin and an alpha, beta-ethylenically unsaturated carboxylic acid. In particular, the compositions may be melt spun and drawn into filaments having good mechanical properties.

19 Claims, No Drawings

BLENDS OF NYLON M5T AND AN IONOMER

BACKGROUND OF THE INVENTION

1. Field of the Invention

The invention relates to improved compositions of poly (2-methylpentamethylene terephthalamide), also known as nylon M5T, which can be formed into shaped articles, e.g., filaments and fibers, of good mechanical properties.

2. Description of Related Art

The following information is disclosed in accordance with the terms of 37 CFR 1.56, 1.97 and 1.98.

Japanese Patent publication No. 69-19,551, published Aug. 23, 1969 discloses a process for the preparation of nylon M5T by prepolymerizing a salt of terephthalic acid and 2-methylpentamethylenediamine in the presence of water, washing the unreacted salt from the prepolymer with water, and heating the washed prepolymer to 285°-290° C. under vacuum in a post-polymerization step to obtain the final polymer. Also disclosed is the melt spinning and drawing of the polymer into a yarn.

U.S. Pat. No. 3,526,680 issued Sep. 1, 1970 to Cherdron, discloses molding composition stated to have improved impact strength and comprising an acetal polymer and any of various ionic polymers.

U.S. Pat. No. 4,731,396 issued Mar. 15, 1988 to Auerbach et al., discloses molding compositions having improved stability comprising an acetal polymer compounded with a dispersion of an amidine stabilizer in any of various ionic carrier resins.

SUMMARY OF THE INVENTION

In accordance with this invention, novel polymer compositions capable of being formed into shaped articles are provided comprising a poly (2-methylpentamethylene terephthalamide), also known as nylon M5T, and a minor amount of an ionic polymer or "ionomer". In particular, these compositions can be melt spun and drawn into filaments having superior mechanical properties.

DESCRIPTION OF PREFERRED EMBODIMENTS

The nylon M5T contemplated under this invention is generally capable of being formed into shaped articles, e.g., filaments of good mechanical properties, and in most cases have an inherent viscosity (I.V.) of at least about 1.0, preferably from about 1.4 to greater than about 2.0 dl./g., determined from a dilute solution of the polymer in concentrated sulfuric acid, a melting point of about 270° to 280° C., and a glass transition temperature of about 138° to 248° C.

In addition to homopolymers wherein the nylon M5T is composed solely of 2-methylpentamethylene terephthalamide (M5T) units, copolyamides are contemplated which contain for example at least about 75% of the foregoing M5T units. Thus, up to about 25% of the other units, e.g., alkylene terephthalamide units other than M5T such as hexamethylene terephthalamide (6T) units, may also be present. The nylon M5T may be prepared using any of several general polymerization methods known in the art. These include, for example, bulk melt polymerization at atmospheric pressure wherein 2-methylpentamethylenediamine (M5 diamine) is heated with terephthalic acid (TA) in the presence of water and, if desired a catalyst such as triphenyl phosphite, until solid M5T salt forms after removal of the water at about 200°-220° C., and the salt is heated for varying periods up to about 310° C. with the final heating being done under vacuum; interfacial polymerization of M5 diamine with terephthaloyl chloride dissolved in a solvent such as xylene; solvent polymerization of M5 diamine with diphenylterephthalate dissolved in a solvent such as m-cresol; and solid state polymerization of M5T salt under pressure wherein the salt is heated and maintained at a temperature, for example, of about 295° C. under autogenous pressure.

Any of a wide variety of specific ionomers may be blended with the nylon M5T under the invention, as will be evident to those skilled in the art. A preferred class of ionomers are copolymers of alpha-olefins containing, for example, 2 to 10, preferably 2 to 6 carbon atoms with from about 0.2 to 50, preferably about 3 to 30 mol % of an alpha, beta-ethylenically unsaturated carboxylic acid, in which about 10 to 90% of the carboxyl groups are neutralized with cations having a valence of 1 to 3. Preferably the neutralizing cations are metals from Groups IA, IIA, IIIA, and the transition elements of the Periodic Table, e.g., transition elements such as zinc, alkaline earth metals such as calcium and magnesium, and alkali metals such as sodium and potassium. The ionomer suitably may have a molecular weight within a wide range as indicated, for example, by a number average molecular weight of about 500 to about 500,000 or a melt index of about 0.1 to 1000 g/10 min as determined by ASTM-D-1238.

Suitable alpha-olefins which may be used in the preparation of the contemplated ionomers are ethylene, propylene, butene-1, pentene-1, hexene-1, heptene-1, 3-methylbutene-1, and 4-methylbutene-1. The preferred alpha-olefin is ethylene.

The alpha, beta-ethylenically unsaturated carboxylic acids which can be copolymerized with the alpha-olefin preferably have 3 to 8 carbon atoms. Examples of such acids include acrylic acid, methacrylic acid, maleic acid, fumaric acid monoesters of dicarboxylic acids, such as methyl hydrogen maleate, methyl hydrogen fumarate, and ethyl hydrogen fumarate, and maleic anhydride, which is considered to be an acid in the present invention.

Although the olefin content of the ionic copolymer should be at least 50 mol percent, more than one olefin can be employed to provide the hydrocarbon segments of the copolymer. Moreover, more than one alpha, beta-ethylenically unsaturated carboxylic acid may also be employed. Additionally, any third copolymerizable monomer can be employed in combination with the olefin and the carboxylic acid comonomer. Preferred termomomers are vinyl esters and acrylates, e.g., vinyl alkanoates and alkyl acrylates and methacrylates having up to eight carbon atoms, such as vinyl acetate, vinyl propionate, methyl methacrylate, ethyl acrylate and isobutyl acrylate.

Ionomers which may be used in the practice of the invention are those of relatively high molecular weight, e.g., those having a melt index of about 0.1 to 1000 g./10 min. as disclosed for example in U.S. Pat. Nos. 3,264,272 and 3,404,134, and/or those having a weight average molecular weight of above 5000 and up to one million as disclosed in U.S. Pat. No. 3,526,680; and those of relatively lower molecular weight, e.g., a number average molecular weight of about 500 to 20,000 such as those disclosed in U.S. Pat. Nos. 4,381,376, 4,412,040 and previously cited U.S. Pat. No. 4,731,396. The entire disclosures of the foregoing references are incorporated herein by reference. Some suitable commercial ionomers are those sold by DuPont Company under the trademark "Surlyn".

The novel blends of nylon M5T and ionomer of this invention may be prepared by any conventional procedure that will result in a substantially uniform blend or admixture of the components. Preferably dry or melt blending procedures and equipment are used. For example the ionomer can be dry mixed with the nylon M5T (in the form of pellets, chips, flakes, granules or powder), typically at room temperature, and the resulting mixture melt blended in any conventional type blending equipment, which is customarily heated to a temperature of from about 280° to about 300° C. and preferably from about 293° to about 297° C. The sequence of addition of the components is not critical, in forming the blend. An inert atmosphere such as a nitrogen blanket or purge should be used during the blending operation.

Preferably, the nylon M5T and the ionomer are dried (either individually or together) before being subjected to the blending procedure. Drying is done in desiccated air at a temperature and for a time suitable to reduce the moisture content to a point at which it will not have any adverse effect on the subsequent use of the blend or the properties of the resulting product, e.g., the melt spinning of the blend or the properties of the resulting filaments. In general, any conventional drying procedure can be used to reduce the moisture content to below about 0.1 wt. %, based on the total weight of the nylon M5T and ionomer, preferably below about 0.05 wt. %, and most preferably below about 0.01 wt. %. For example, a preferred procedure is vacuum drying at about 130° C. for at least about 16 hours.

If conventional additives such as those previously identified have not previously been added to the nylon M5T or ionomer during the processing of these individual components of the blend, i.e., before they are admixed with each other, they may be added during blending.

The uniform admixture resulting from the blending procedure may then be comminuted mechanically, for example, by chopping, pelletizing or grinding, into granules, pellets, chips, flakes or powders, suitable for subsequent use, e.g., melt spinning into fibers.

The polymer blends of this invention preferably contain, for example, about 0.5 to 5 wt. %, more preferably about 0.5 to 1.5 wt. % of ionomer based on the total weight of polymer in the blend which in most cases will consist of nylon M5T and ionomer. However, in some instances, a minor amount, e.g., up to about 50 wt. % based on the total polymer in the blend, of at least one other polymer compatible with the nylon M5T and ionomer may also be present.

The novel polymer blends of this invention may be formed into filaments of excellent mechanical properties, using conventional melt spinning techniques. Furthermore, filaments can be spun from the disclosed blends of nylon M5T and ionomer and drawn at higher draw ratios to yield better mechanical properties such as tenacity and modulus, than when the same nylon M5T not containing any ionomer is similarly spun and drawn. Thus draw ratios of at least about 5, preferably about 5 to 8, may be employed without breaking the filaments, when drawing as spun filaments made from the polymer blends of this invention. By these means, continuous filament yarns may be formed, for example, having a tensile strength of about 5 to 9 grams/denier, a breaking elongation of about 10 to 20%, and a modulus of about 5 to 80 grams/denier. Moreover, staple fiber products may also be produced which can be further processed into spun staple yarns and other products. These fiber products have utility in a wide variety of applications, particularly industrial applications such as tire cord.

The following examples further illustrate the invention.

EXAMPLE 1

In this and the following examples, the nylon M5T had an inherent viscosity (I.V.) of 14 determined at 25° C. and 0.4% concentration in 97.5% concentrated sulfuric acid, a melting point of 276° C., and a glass transition temperature of 143° C.

The nylon M5T was intimately blended with 1 wt. % of an ionomer sold by the DuPont Company under the trademark "Surlyn 9020" which is an ethylene-methacrylic acid-isobutyl acrylate terpolymer containing about 9.0 wt. % of methacrylic acid in which about 50–75% the carboxyl groups are neutralized with zinc ions, and 9.59 wt. % of isobutyl acrylate. This ionomer has a melt index of 1.0 g/10 min. (ASTM D-1238), a specific gravity of 0.96 (ASTM D-792) and a Vicat softening point of 57° C. (ASTM D-1525-70). The blending was carried out using a Haake Buchler Rheocord System 40 mixer equipped with roller blades. Before blending, the nylon M5T was dried at 130° C. and the ionomer at 60° C., both overnight under vacuum. The blending was carried out at 295° C., 60 RPM and at a rate of 95–100 SCFH, with the dried nylon M5T being first added to the mixer within about the first 5 minutes and the dried ionomer being added within the next 11 minutes. The entire mixing operation was conducted under a nitrogen flow.

In preparation for spinning, the polymer blend was dried overnight at 140° C. under vacuum and fed to a rod die under nitrogen atmosphere for the preparation of a spinning rod suitable as feed to a melt spinning unit. The rod was pressed to 5000 lbs. at room temperature, hot pressed to 5000 lbs. at 175° C., hot pressed to 1000 lbs. at 250° C., held 10 minutes at 250° C., cooled to room temperature and removed.

The foregoing rod was utilized as the polymer feed to a micromelt spinning unit equipped with a filter pack of 80/120 mesh shattered metal, a grid and a spinnerette containing a single hole 0.020 inch in diameter and 0.1 inch in depth. Spinning was carried out using a ram pressure against the rod of 1200 psig., a block pressure of 300 psig., a block temperature of 316° C., a grid temperature of 327° C., a melt temperature of 318° C. and a take-up speed of 1600 meters/min., to produce as spun filaments having a denier of 53.6, a tenacity of 0.6 grams/denier, a breaking elongation of 51.9% and a modulus of 28.4 grams/denier.

The filaments were either single or double drawn, with the drawing taking place over a hot shoe between the feed roll and first draw roll, and if double drawing was being done, between the first and second draw rolls. The feed roll operated at a speed of 1 meter/min in all cases. The speed of the first draw roll and second draw roll, if used, in meters/min. (m/m), the temperature of the first hot shoe and second hot shoe, if used, and the properties of the resulting filaments including denier (Den.) tenacity in grams/denier (Ten., gpd), breaking elongation (Elong., %) and modulus in grams/denier (Mod., gpd) are shown in Table I.

TABLE I

| Sample No. | Hot Shoe 1, °C. | Draw Roll 1, m/m | Hot Shoe 2, °C. | Draw Roll 2, m/m | Den. | Ten., gpd | Elong., % | Mod., gpd |
|---|---|---|---|---|---|---|---|---|
| 1-A | 130 | 5.0 | 200 | 5.7 | 9.2 | 4.5 | 9.9 | 60.8 |
| 1-B | 130 | 5.0 | — | — | 9.4 | 3.2 | 9.4 | 52.4 |
| 1-C | 130 | 5.0 | 220 | 5.7 | 8.8 | 4.2 | 11.1 | 58.8 |
| 1-D | 150 | 5.0 | 230 | 5.5 | 8.6 | 4.3 | 11.5 | 59.4 |
| 1-E | 150 | 5.0 | — | — | 9.6 | 3.6 | 13.5 | 54.0 |
| 1-F | 180 | 6.1 | — | — | 8.3 | 5.4 | 11.5 | 61.1 |

Since the speed of the feed roll in the foregoing and subsequent examples is in all cases 1 meter/min, the overall draw ratio is the same as the speed of the draw roll in single stage drawing or the speed of the second draw roll in double stage drawing.

EXAMPLE 2

The procedure of Example 1 was generally followed except for the following. Instead of Surlyn 9020, the polymer blend contained 1 wt. % of an ionomer sold by DuPont company as "Surlyn 8920" which is a copolymer of the same monomers but containing a somewhat higher percentage of methacrylic acid as the Surlyn 9020 of Example 1, with a somewhat higher percentage of the carboxyl groups neutralized with sodium rather than zinc ions, and having a melt index of 0.9 g/10 min., a specific gravity of 0.95 and a Vicat softening point of 58° C. Spinning was carried out using a ram pressure of 800 psig., a block pressure of 200 psig., a block temperature of 316° C., a grid temperature of 328° C., a melt temperature of 319° C. and a take up speed of 25 meters/min to produce as spun filaments having a denier of 55.4, a tenacity of 0.9 gram/denier, a breaking elongation of 283.3% and a modulus of 28.2 grams/denier. Drawing conditions and properties of the drawn filaments are shown in Table II.

TABLE II

| Sample No. | Hot Shoe 1, °C. | Draw Roll 1, m/m | Hot Shoe 2, °C. | Draw Roll 2, m/m | Den. | Ten., gpd | Elong., % | Mod., gpd |
|---|---|---|---|---|---|---|---|---|
| 2-A | 100 | 3.5 | 145 | 5.0 | 9.6 | 4.3 | 12.7 | 57.0 |
| 2-B | 130 | 3.7 | 165 | 5.1 | 9.5 | 3.7 | 16.6 | 52.7 |
| 2-C | 130 | 3.7 | 200 | 5.1 | 9.5 | 4.1 | 15.3 | 54.7 |
| 2-D | 130 | 3.7 | 220 | 5.1 | 9.4 | 4.1 | 14.0 | 57.0 |
| 2-E | 130 | 3.7 | 230 | 5.1 | 9.8 | 3.9 | 12.8 | 56.7 |
| 2-F | 150 | 4.1 | 230 | 5.3 | 10.6 | 2.9 | 17.1 | 50.0 |

EXAMPLE 3

The procedure of Example 1 was generally followed except for the following. Instead of Surlyn 9020, the polymer blend contained 1 wt. % of an ionomer sold by DuPont Company as "Surlyn 8527" which is a copolymer of the same monomers present in the same percentages the Surlyn 9020 described in Example 1, with percentage of neutralized carboxyl groups being somewhat lower than the Surlyn 8920 of Example 2, the neutralizing ions also being sodium, and having a melt index of 1.3 g/10 min., a specific gravity of 0.94, and a Vicat softening point of 73° C. Spinning was carried out using a ram pressure of 800 psig., a block pressure of 300 psig., a block temperature of 322° C., a grid temperature of 325° C., a melt temperature of 322° C. and a take up speed of 25 meters/min. to produce as spun filaments having a denier of 37.3, a tenacity of 1.1 grams/denier, a breaking elongation of 282.0% and a modulus of 36.1 grams/denier. Drawing conditions and properties of the drawn filaments are shown in Table III.

TABLE III

| Sample No. | Hot Shoe 1, °C. | Draw Roll 1, m/m | Hot Shoe 2, °C. | Draw Roll 2, m/m | Den. | Ten., gpd | Elong., % | Mod., gpd |
|---|---|---|---|---|---|---|---|---|
| 3-A | 130 | 5.5 | — | — | 9.5 | 4.7 | 18.2 | 53.9 |
| 3-B | 130 | 5.0 | — | — | 9.0 | 4.8 | 15.8 | 53.1 |
| 3-C | 130 | 5.0 | 185 | 6.0 | 7.4 | 7.4 | 12.9 | 68.4 |
| 3-D | 130 | 5.0 | 195 | 5.9 | 8.0 | 7.0 | 14.0 | 67.6 |
| 3-E | 150 | 5.8 | — | — | 8.8 | 6.5 | 15.3 | 62.6 |
| 3-F | 150 | 5.4 | 195 | 5.9 | 8.3 | 6.8 | 12.5 | 66.1 |

EXAMPLE 4

The procedure of Example 3 was generally followed except for the following. Instead of 1 wt. % of Surlyn 8527, the polymer blend contained 3 wt. % of this ionomer. Spinning was carried out using a ram pressure of 3000 psig., a block pressure of 350 psig., a block temperature of 297° C., a grid temperature of 301° C., a melt temperature of 301° C. and a take up speed of 30 meters/min. to produce as spun filaments having a denier of 61.6, a tenacity of 0.9 gram/denier, a breaking elongation of 277.4%, and a modulus of 26.9 grams/denier. Drawing conditions and properties of the drawn filaments are shown in Table IV.

TABLE IV

| Sample No. | Hot Shoe 1, °C. | Draw Roll 1, m/m | Hot Shoe 2, °C. | Draw Roll 2, m/m | Den. | Ten., gpd | Elong. % | Mod., gpd |
|---|---|---|---|---|---|---|---|---|
| 4-A | 136 | 4.0 | 193 | 5.5 | 11.9 | 6.3 | 13.6 | 63.4 |
| 4-B | 142 | 4.2 | 196 | 5.8 | 13.6 | 6.0 | 12.3 | 63.3 |
| 4-C | 150 | 5.0 | 196 | 5.8 | 10.5 | 6.4 | 10.7 | 63.9 |
| 4-D | 150 | 5.5 | 196 | 5.8 | 12.1 | 4.4 | 15.2 | 52.0 |

EXAMPLE 5

The procedure of Example 3 was generally followed using a blend containing 1 wt. % of Suralyn 8527, except for the following: Spinning was carried out using a ram pressure of 1000 psig., a block pressure of 150 psig., a block temperature of 298° C., a grid temperature of 303° C., a melt temperature of 300° C. and a take up speed of 25 meters/min. to produce as spun filmanets having a denier of 76.2, a tenacity of 4.0 grams/denier, a breaking elongation of 260.9%, and a modulus of 28.5 grams/denier. Drawing conditions and properties of the drawn filmaments are shown in Table V.

TABLE V

| Sample No. | Hot Shoe 1, °C. | Draw Roll 1, m/m | Hot Shoe 2, °C. | Draw Roll 2, m/m | Den. | Ten., gpd | Elong. % | Mod., gpd |
|---|---|---|---|---|---|---|---|---|
| 5-A | 130 | 4.6 | — | — | 20.0 | 4.0 | 24.0 | 54.9 |
| 5-B | 140 | 4.6 | — | — | 18.4 | 4.5 | 18.7 | 56.2 |
| 5-C | 140 | 4.6 | 175 | 6.2 | 10.9 | 6.4 | 13.0 | 63.1 |
| 5-D | 140 | 4.6 | 180 | 6.0 | 14.1 | 6.3 | 12.2 | 63.4 |
| 5-E | 140 | 4.6 | 185 | 6.2 | 13.9 | 6.4 | 10.7 | 63.9 |
| 5-F | 140 | 4.6 | 190 | 6.0 | 14.3 | 6.3 | 11.7 | 64.2 |
| 5-G | 154 | 4.6 | 195 | 6.0 | 14.5 | 6.0 | 13.9 | 62.5 |

I claim:

1. A polymer composition capable of being formed into shaped articles comprising a poly(2-methylpentamethylene terephthalamide), also known as nylon M5T, and about 0.5 to 5 weight % of ionomer based on the total of nylon M5T and ionomer, wherein said ionomer has a weight average molecular weight of about 500 to one million.

2. The composition of claim 1 wherein said ionomer is a partially neutralized copolymer of an alpha-olefin and an alpha, beta-ethylenically unsaturated carboxylic acid.

3. The composition of claim 2 wherein said ionomer is a copolymer of ethylene and acrylic or methacrylic acid in which about 10 to 100% of the carboxyl groups are neutralized with a metal from Group IA, IIA, IIIA or the transition elements of the Periodic Table.

4. The composition of claim 3 wherein said metal is zinc.

5. The composition of claim 3 wherein said metal is sodium.

6. The composition of claim 1 wherein said composition contains about 0.5 to 1.5 wt. % of ionomer based on the weight of the total polymer.

7. A method of forming fiber products comprising melt spinning a polymer composition comprising a poly(2-methylpentamethylene terephthalamide), also known as nylon M5T, and a minor amount of an ionomer, and drawing the as spun filaments.

8. The method of claim 7 wherein said ionomer is a partially neutralized copolymer of an alpha-olefin and an alpha, beta-ethylenically unsaturated carboxylic acid.

9. The method of claim 8 wherein said ionomer is a copolymer of ethylene and acrylic or methacrylic acid in which about 10 to 100% of the carboxyl groups are neutralized with a metal from Group IA, IIA, IIIA or the transition elements of the Periodic Table.

10. The method of claim 7 wherein said composition contains about 0.5 to 5 wt. % of ionomer based on the weight of total polymer.

11. The method of claim 10 wherein said composition contains about 0.5 to 1.5 wt. % of ionomer.

12. The method of claim 7 wherein said drawing is carried out at a draw ratio of at least 5.

13. A fiber product composed of a polymer composition comprising a poly(2-methylpentamethylene terephthalamide), also known as nylon M5T, and a minor amount of an ionomer.

14. The fiber product of claim 13 wherein said ionomer is a partially neutralized copolymer of an alpha-olefin and an alpha, beta-ethylenically unsaturated carboxylic acid.

15. The fiber product of claim 14 wherein said ionomer is a copolymer of ethylene and acrylic or methacrylic acid in which about 10 to 100% of the carboxyl groups are neutralized with a metal from Group IA, IIA, IIIA or the transition elements of the Periodic Table.

16. The fiber product of claim 15 wherein said metal is zinc.

17. The fiber product of claim 15 wherein said metal is sodium.

18. The fiber product of claim 13 wherein said composition contains about 0.5 to 5 wt. % of ionomer based on the weight of total polymer.

19. The fiber product of claim 18 wherein said composition contains about 0.5 to 1.5 wt. % of ionomer.

* * * * *